(12) United States Patent
Kobayashi (10) Patent No.: US 7,362,948 B2
(45) Date of Patent: Apr. 22, 2008

(54) VIDEO COPYING APPARATUS

(75) Inventor: Koji Kobayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 730 days.

(21) Appl. No.: 10/984,765

(22) Filed: Nov. 10, 2004

(65) Prior Publication Data
US 2005/0117877 A1    Jun. 2, 2005

(30) Foreign Application Priority Data
Nov. 12, 2003   (JP)   ............. P2003-381973

(51) Int. Cl.
*H04N 5/93*   (2006.01)
*H04N 5/00*   (2006.01)
*G11B 5/86*   (2006.01)

(52) U.S. Cl. ............. 386/52; 386/126; 360/15

(58) Field of Classification Search .......... 386/1, 386/46, 52–55, 111–112, 125–126; 360/15
See application file for complete search history.

(56) References Cited

U.S. PATENT DOCUMENTS 5,603,058 A * 2/1997 Belknap et al. ............ 710/35

6,201,924 B1 * 3/2001 Crane et al. ............... 386/52

FOREIGN PATENT DOCUMENTS

| JP | 1-294250 | 11/1989 |
|----|----------|---------|
| JP | 1-303686 | 12/1989 |
| JP | 8-31044 | 2/1996 |
| JP | 2002-352506 | 12/2002 |
| JP | 2003-123386 | 4/2003 |

* cited by examiner

*Primary Examiner*—Marsha Banks-Harold
*Assistant Examiner*—Michael P Choi
(74) *Attorney, Agent, or Firm*—Morgan, Lewis & Bockius LLP (57) ABSTRACT

When execution of copying of video and audio from a DVD from a videotape is instructed, a video copying apparatus 1 detects the remaining amount of the videotape set in a apparatus and reproduction time of video and audio copied to the videotape and based on these, it is determined whether the video and audio are recorded on the videotape in a standard mode or a longer-recording mode. Also, when execution of copying of video and audio from a videotape from a DVD is instructed, free space of the DVD and reproduction time of video and audio copied to the DVD are detected and based on these, a compression ratio of the video and audio recorded on the DVD is determined.

11 Claims, 4 Drawing Sheets

VIDEO COPYING APPARATUS

BACKGROUND OF THE INVENTION

1. Field of the Invention

The present invention relates to a video copying apparatus for copying video and audio recorded on one of an optical disk (particularly, a DVD) and a videotape to the other.

2. Description of the Related Art

Conventionally, videocassette recorders (VCR) for recording video and audio on a videotape by an analog signal or DVD recorders for recording video and audio on a digital versatile disk (hereinafter called DVD) by a digital signal have become commercially practical and have become widespread generally. Also, with the widespread use of these apparatus, many users copy video and audio recorded on the videotape or the DVD to another videotape or DVD. The video and audio may be copied between the same kinds of record media or may be copied between different kinds of record media. Recently in particular, video and audio recorded on a videotape by an analog signal greatly degrade with time, so that many users copy the video and audio recorded on the videotape to a DVD. For example, many users copy video and audio picked up by a video camera during travel to a DVD in order to leave the video and audio by sharp video and audio forever. In the DVD, video and audio are recorded by a digital signal as is well known, so that the recorded video and audio little degrade with time.

Also, an apparatus for determining a compression ratio of video and audio copied according to free space of another record medium in the case of copying video and audio recorded on a record medium to another record medium is proposed in JP-A-2003-123386. The apparatus makes effective use of a record area of the record medium by determining the compression ratios so as to record the copied video and audio on one record medium without discontinuity.

SUMMARY OF THE INVENTION

However, the apparatus for copying video and audio recorded on a record medium of a copy source by a digital signal to a record medium of a copy destination by a digital signal is proposed in JP-A-2003-123386. In other words, the apparatus was not an apparatus in which video and audio recorded on a videotape by an analog signal are copied to a DVD by a digital signal and vice versa video and audio recorded on a DVD by a digital signal are copied to a videotape by an analog signal. Therefore, there was a problem that the apparatus proposed in Patent Reference 1 cannot be used for sharply leaving the video and audio recorded on the videotape by the analog signal forever and many users making such a copy cannot make effective use of a record area of the videotape or the DVD.

Incidentally, copying video and audio recorded on a DVD to a videotape is also made generally.

Therefore, one of objects of the invention is provide a video copying apparatus capable of mutually copying video and audio between an optical disk on which the video and audio are recorded by a digital signal and a videotape on which the video and audio are recorded by an analog signal and making effective use of a record area of a record medium to which the video and audio are copied.

According to a first aspect of the invention, there is provided a video copying apparatus including: a first recording and reproducing unit that records video and audio on an optical disk and reproduces video and audio recorded on the optical disk; a second recording and reproducing unit that records video and audio on a videotape and reproduces video and audio recorded on the videotape; a first copying unit that controls the first recording and reproducing unit to reproduce the video and audio recorded on the optical disk and controls the second recording and reproducing unit to record the video and audio reproduced by the first recording and reproducing unit on the videotape; a second copying unit that controls the second recording and reproducing unit to reproduce the video and audio recorded on the videotape and controls the first recording and reproducing unit to record the video and audio reproduced by the second recording and reproducing unit on the optical disk; a first recording mode determination unit that, when execution of the first copying unit is instructed, detects remaining amount of the videotape and reproduction time of the video and audio to be copied onto the videotape by fast-forwarding the videotape to the end, and determines whether to record the video and audio onto the videotape in a standard mode or in a longer-recording mode based on the remaining amount of the videotape and the reproduction time of the video and audio to be copied onto the videotape; a second recording mode determination unit that, when execution of the second copying unit is instructed, detects free space of the optical disk and reproduction time of video and audio to be copied onto the optical disk by fast-forwarding the videotape to the end, and determines a compression ratio of the video and audio to be used in recording the video and audio on the optical disk from among a plurality of preset compression ratios; and an input unit having a first button for instructing execution of the first copying unit and a second button for instructing execution of the second copying unit.

According to a second aspect of the invention, there is provided a video copying apparatus including: a first recording and reproducing unit that records video and audio on an optical disk and reproduces video and audio recorded on the optical disk; a second recording and reproducing unit that records video and audio on a videotape and reproduces video and audio recorded on the videotape; a first copying unit that controls the first recording and reproducing unit to reproduce the video and audio recorded on the optical disk and controls the second recording and reproducing unit to record the video and audio reproduced by the first recording and reproducing unit on the videotape; a second copying unit that controls the second recording and reproducing unit to reproduce the video and audio recorded on the videotape and controls the first recording and reproducing unit to record the video and audio reproduced by the second recording and reproducing unit on the optical disk; a first recording mode determination unit that, when execution of the first copying unit is instructed, detects remaining amount of the videotape and reproduction time of the video and audio to be copied onto the videotape, and determines whether to record the video and audio onto the videotape in a standard mode or in a longer-recording mode based on the remaining amount of the videotape and the reproduction time of the video and audio to be copied onto the videotape; and a second recording mode determination unit that, when execution of the second copying unit is instructed, detects free space of the optical disk and reproduction time of video and audio to be copied onto the optical disk, and determines a compression ratio of the video and audio to be used in recording the video and audio on the optical disk from among a plurality of preset compression ratios.

According to a third aspect of the invention, there is provided a video copying apparatus including: a first recording and reproducing unit that records video and audio on an optical disk and reproduces video and audio recorded on the optical disk; a second recording and reproducing unit that records video and audio on a videotape and reproduces video and audio recorded on the videotape; a copying unit that controls the first recording and reproducing unit to reproduce the video and audio recorded on the optical disk and controls the second recording and reproducing unit to record the video and audio reproduced by the first recording and reproducing unit on the videotape; and a recording mode determination unit that, when execution of the copying unit is instructed, detects remaining amount of the videotape and reproduction time of the video and audio to be copied onto the videotape, and determines whether to record the video and audio onto the videotape in a standard mode or in a longer-recording mode based on the remaining amount of the videotape and the reproduction time of the video and audio to be copied onto the videotape.

According to a fourth aspect of the invention, there is provided a video copying apparatus including: a first recording and reproducing unit that records video and audio on an optical disk and reproduces video and audio recorded on the optical disk; a second recording and reproducing unit that records video and audio on a videotape and reproduces video and audio recorded on the videotape; a copying unit that controls the second recording and reproducing unit to reproduce the video and audio recorded on the videotape and controls the first recording and reproducing unit to record the video and audio reproduced by the second recording and reproducing unit on the optical disk; and a recording mode determination unit that, when execution of the copying unit is instructed, detects free space of the optical disk and reproduction time of video and audio to be copied onto the optical disk, and determines a compression ratio of the video and audio to be used in recording the video and audio on the optical disk from among a plurality of preset compression ratios.

BRIEF DESCRIPTION OF THE DRAWINGS

The above objects and advantages of the present invention will become more apparent by describing a preferred exemplary embodiment thereof in detail with reference to the accompanying drawings, wherein.

DETAILED DESCRIPTION OF THE PREFERRED EMBODIMENTS

A video copying apparatus which according to an embodiment of the invention will be described below.

Figure 1:
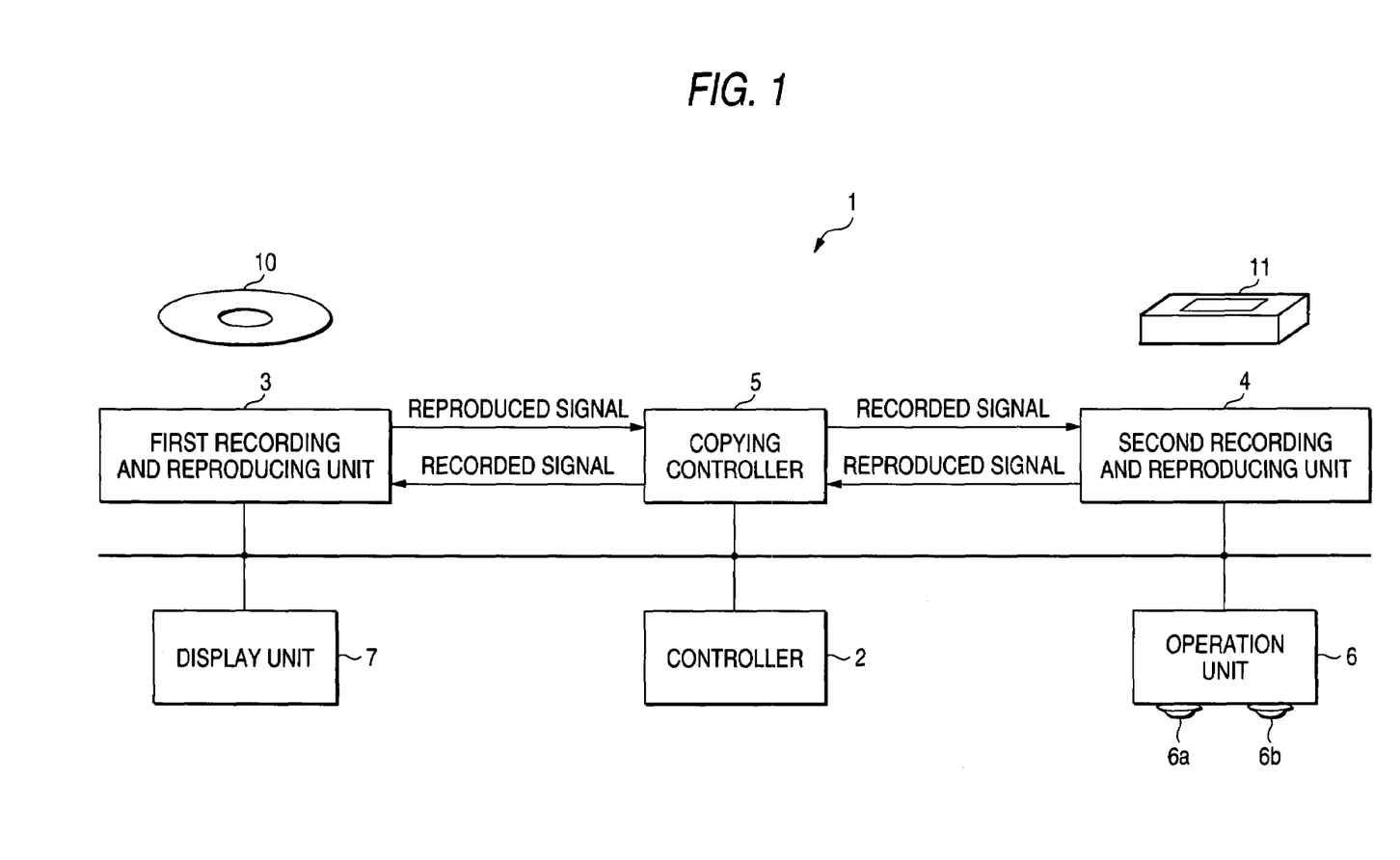
FIG. 1 is a block diagram showing a configuration of a video copying apparatus which according to an embodiment of the invention.

A video copying apparatus 1 includes a controller 2 for controlling an operation of a apparatus, a first recording and reproducing unit 3 for reproducing video and audio recorded on a DVD 10 set in the apparatus and recording video and audio on the DVD 10, a second recording and reproducing unit 4 for reproducing video and audio recorded on a videotape 11 set in the apparatus and recording video and audio on the videotape 11, a copying controller 5 for controlling copying of video and audio between the DVD 10 and the videotape 11, an operation unit 6 for performing an input operation to the apparatus, and a display unit 7 for displaying an operation status of the apparatus and a message for a user. The video and audio are recorded on the DVD 10 by a digital signal and are recorded on the videotape 11 by an analog signal.

The first recording and reproducing unit 3 is provided with a pickup head, a decoder for decoding a digital signal according to video and audio read from the DVD 10, and an encoder for encoding a digital signal according to video and audio recorded on the DVD 10. The first recording and reproducing unit 3 passes a signal decoded by the decoder to the copying controller 5 as a reproduced signal. Also, a recorded signal passed from the copying controller 5 is encoded by the encoder and is recorded on the DVD 10. The encoder compresses the recorded signal by a compression ratio instructed from the controller 2. The second recording and reproducing unit 4 comprises a reproducing magnetic head for reading video and audio read from the videotape 11, and a recording magnetic head for recording video and audio on the videotape 11. The second recording and reproducing unit 4 passes an analog signal of the video and audio read from the videotape 11 to the copying controller 5 as a reproduced signal, and records a recorded signal passed from the copying controller 5 on the videotape 11 in a recording mode (a standard mode or a longer-recording mode) instructed from the controller 2.

A digital input terminal, a digital output terminal, an analog input terminal and an analog output terminal (not shown) are connected to the copying controller 5. Also, an A/D conversion part and a D/A conversion part are provided. When video and audio are copied (dubbed) from the DVD 10 to the videotape 11, the copying controller 5 makes D/A conversion of a reproduced signal (digital signal) outputted from the first recording and reproducing unit 3 by the D/A conversion part and passes the signal to the second recording and reproducing unit 4 as a recorded signal. Also, at the time, the reproduced signal outputted from the first recording and reproducing unit 3 is outputted to the digital output terminal as it is, and the recorded signal in which the D/A conversion of the reproduced signal outputted from the first recording and reproducing unit 3 is made is outputted to the analog output terminal. Also, when video and audio are copied from the videotape 11 to the DVD 10, the copying controller 5 makes A/D conversion of a reproduced signal (analog signal) outputted from the second recording and reproducing unit 4 by the A/D conversion part and passes the signal to the first recording and reproducing unit 3 as a recorded signal Also, at the time, the reproduced signal outputted from the second recording and reproducing unit 4 is outputted to the analog output terminal as it is, and the recorded signal in which the A/D conversion of the reproduced signal outputted from the second recording and reproducing unit 4 is made is outputted to the digital output terminal.

Also, when video and audio inputted to the digital input terminal are recorded on the DVD 10, the copying controller 5 passes the inputted digital signal to the first recording and reproducing unit 3 as a recorded signal as it is. Also, when video and audio inputted to the digital input terminal are recorded on the videotape 11, D/A conversion of the inputted digital signal is made by the D/A conversion part and the is passed to the second recording and reproducing unit 4 as a recorded signal. Also, when video and audio inputted to the analog input terminal are recorded on the DVD 10, the copying controller 5 makes A/D conversion of the inputted analog signal by the A/D conversion part and passes the to the first recording and reproducing unit 3 as a recorded signal. Further, when video and audio inputted to the analog input terminal are recorded on the videotape 11, the inputted analog signal is passed to the second recording and reproducing unit 4 as a recorded signal as it is.

The first recording and reproducing unit 3 records a recorded signal (digital signal) passed from the copying controller 5 on the DVD 10, and the second recording and reproducing unit 4 records a recorded signal (analog signal) passed from the copying controller on the videotape 11. The copying controller 5 corresponds to first copying unit and second copying unit described in the invention. The operation unit 6 is provided with a first copying button 6a operated by a user when video and audio are copied from the DVD 10 to the videotape 11, and a second copying button 6b operated by a user when video and audio are copied from the videotape 11 to the DVD 10. Also, the operation unit 6 has a receiving part for receiving a control command with is respect to the apparatus sent from a remote controller (not shown).

Incidentally, in the video copying apparatus 1 according to the embodiment, a recording operation of recording video and audio inputted from an external device on the DVD 10 or the videotape 11 or a reproducing operation of outputting video and audio read from the DVD 10 or the videotape 11 as well as an operation according to copying of video and audio between the DVD 10 and the videotape 11 can also be performed singly.

Figure 2:
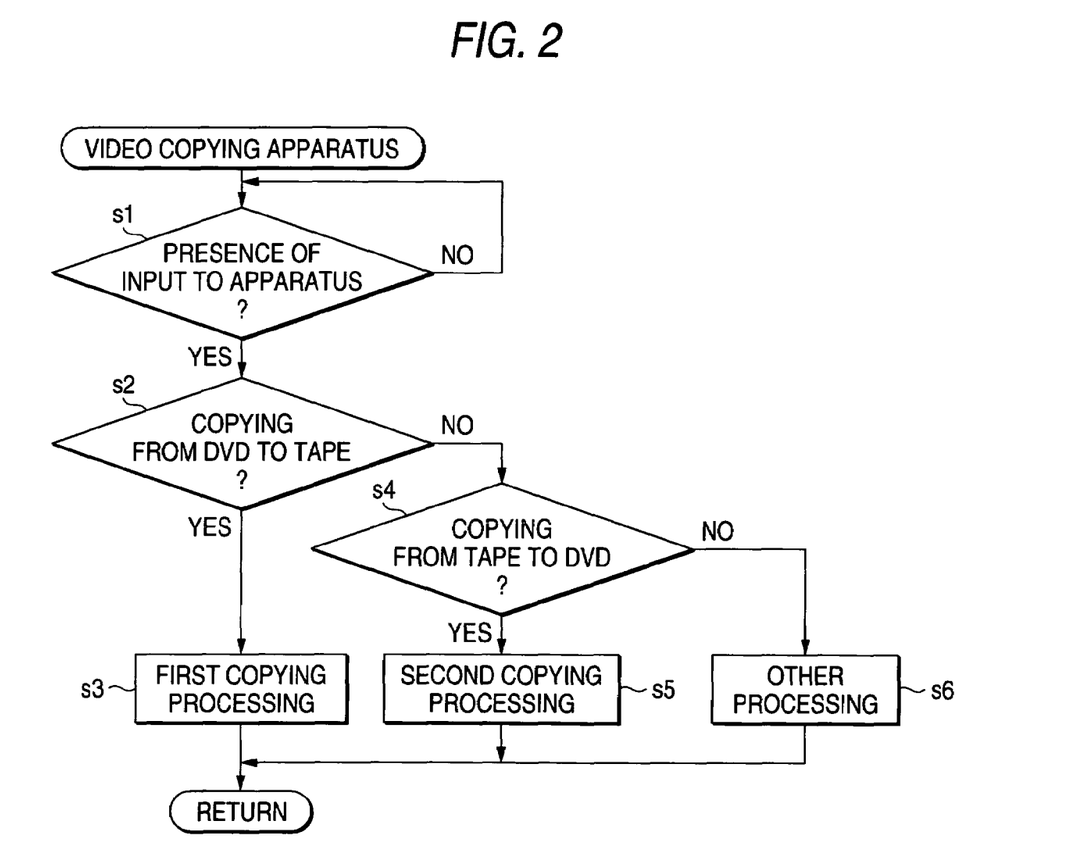
FIG. 2 is a flowchart showing an operation of the video copying apparatus.

Next, an operation of the video copying apparatus 1 according to the embodiment will be described. FIG. 2 is a flowchart showing an operation of the video copying apparatus which is the embodiment of the invention. The video copying apparatus 1 monitors the presence or absence of an input to the apparatus (s1). In the case of doing an input to the apparatus, the controller 2 executes first copying processing described below when the input is an input for instructing copying of video and audio from the DVD 10 to the videotape 11 (s2, s3). Also, second copying processing described below is executed by the controller 2 when the input is an input for instructing copying of video and audio from the videotape 11 to the DVD 10 (s4, s5). Also, when the input is inputs other than these, processing according to the input (other processing) is executed (s6). The other processing executed in s6 includes, for example, recording processing for recording video and audio inputted to the digital input terminal or the analog input terminal on the DVD 10 or the videotape 11, or reproducing processing for reproducing video and audio recorded on the DVD 10 or the videotape 11. In the reproducing processing, the copying controller 5 outputs a reproduced signal of video and audio to the digital input terminal and the analog input terminal, respectively.

Figure 3:
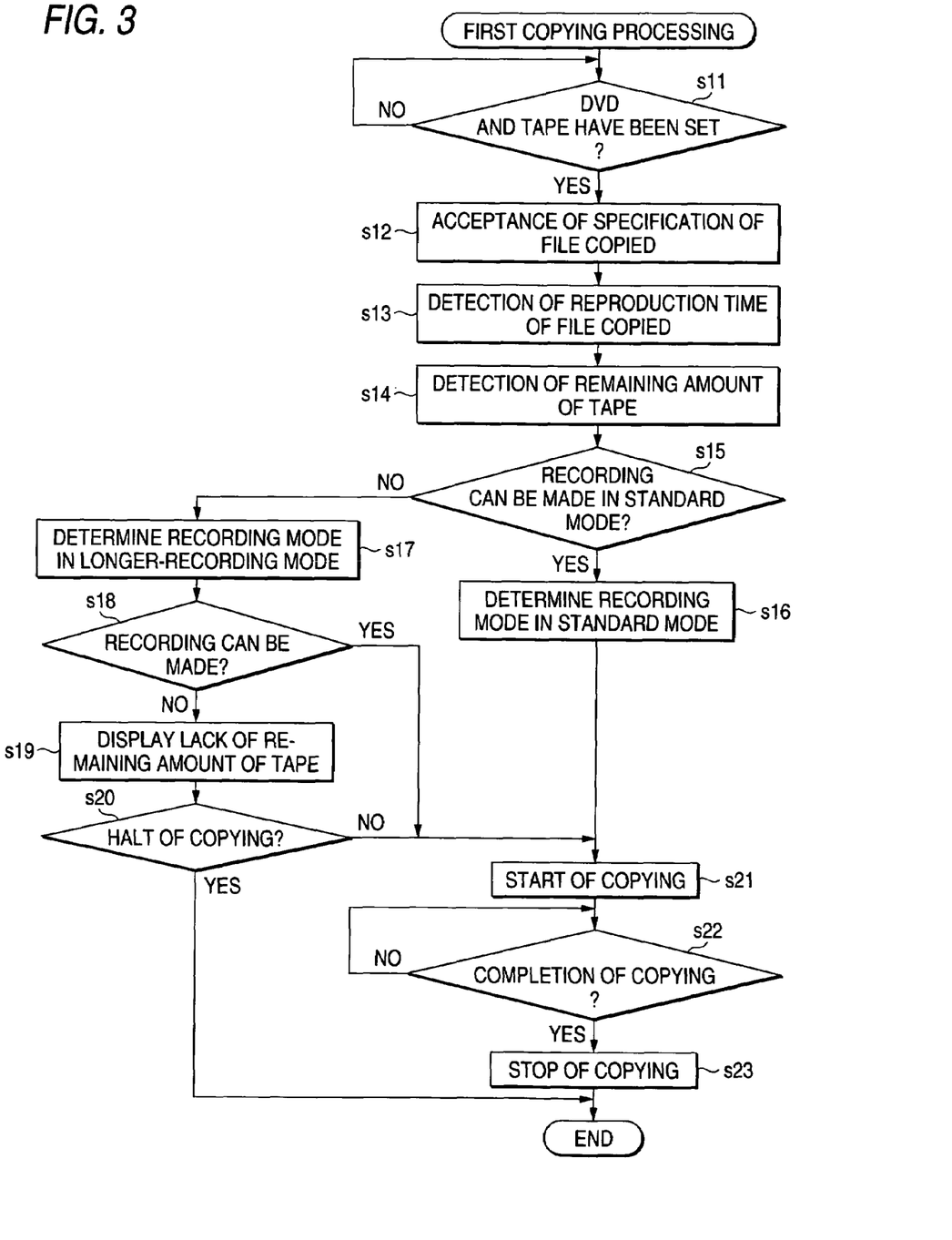
FIG. 3 is a flowchart showing first copying processing in the video copying apparatus.

FIG. 3 is a flowchart showing first copying processing in the video copying apparatus which is the embodiment of the invention. The video copying apparatus 1 starts the processing when the first copying button 6a is operated or a control command for instructing execution of copying of video and audio from the DVD 10 to the videotape 11 is sent from a remote controller (not shown).

First, the video copying apparatus 1 decides whether or not the DVD 10 and the videotape 11 have been set in the apparatus, and when either of them has not been set, the apparatus waits for being set (s11). Next, specification of a file copied to the videotape 11 is accepted from among files of video and audio recorded on the DVD 10 the time (s12) and reproduction time of the file accepted herein is detected (s13). In the DVD 10, file information including a file name or reproduction time, etc. is recorded in a read-in area every file of video and audio recorded. In s13, reproduction time of the file specified is obtained by reading file information about the file specified in s12.

Then, the video copying apparatus 1 detects the remaining amount of the videotape 11 set in the apparatus (s14). In s14, the videotape 11 is fast-forwarded to the end and the remaining amount is detected. Also, when the videotape 11 is fast-forwarded to the end, the videotape is rewound by the amount fast-forwarded the time. As is well known, a recording mode of video and audio with respect to the videotape 11 includes a standard mode (SP mode) and a longer-recording mode (LP mode/SLP (EP) mode). In the longer-recording mode, available recording time becomes double or triple as compared with the standard mode but image quality of video recorded becomes inferior to the standard mode. The video copying apparatus 1 decides whether or not recording can be made in the standard mode based on the reproduction time of the copied file detected in s13 and the remaining amount of the tape detected in s14 (s15). When it decides that the recording can be made in the standard mode, the recording mode of the videotape 11 is determined in the standard mode (s16) and reversely, when it decides that the recording cannot be made, the recording mode of the videotape 11 is determined in the longer-recording mode (s17). When the recording mode of the videotape 11 is determined in the longer-recording mode in s17, the video copying apparatus 1 decides whether or not the copied file can be recorded on the videotape 11 without discontinuity (s18).

When the video copying apparatus 1 decides that it cannot be recorded in s18, its message is displayed on the display unit 7 (s19), and an input as to whether or not the copying of video and audio from the DVD 10 to the videotape 11 is halted is demanded from a user. By such display in s19, the user recognizes that video and audio cannot be copied to the end when the video and audio are copied from the DVD 10 to the videotape 11 set in the apparatus. Then, after the user recognizes that the video and audio are not copied to the end, the user decides whether or not the copying is performed, and its result is inputted to the apparatus. Also, reproduction time (for example, 10 minutes or 10 seconds) of the discontinuous video and audio which cannot be copied may be displayed on the display unit 7 in s19. As a result of the, information for making a proper decision may be given to the user.

When a halt of the copying of video and audio from the DVD 10 to the videotape 11 is inputted by the user, the video copying apparatus 1 ends the present processing. On the other hand, in the case of determining the recording mode of the videotape 11 in the standard mode in s16, the case of deciding that video and audio can be recorded in the longer-recording mode without discontinuity in s18 and the case that execution of the copying of video and audio from the DVD 10 to the videotape 11 is inputted by the user in s20, the copying of video and audio from the DVD 10 to the videotape 11 is started (s21). In s21, the first recording and reproducing unit 3 starts reproduction of the file recorded on the DVD 10 specified in s12, and the copying controller 5 passes a recorded signal in which D/A conversion of a reproduced signal passed from the first recording and reproducing unit 3 is made by the D/A conversion part to the second recording and reproducing unit 4. The second recording and reproducing unit 4 records the recorded signal passed from the copying controller 5 on the videotape 11 in the recording mode determined in s16 or s17.

When the copying of the video and audio from the DVD 10 to the videotape 11 is completed (s22), the video copying apparatus 1 stops a copying operation (s23) and ends the present processing. In s22, it is decided that the copying is completed in the case that copying of the file specified in s12 is completed and the case that a record position of the videotape 11 set in the apparatus reaches the end of the tape. Also, in s23, a reproducing operation of the DVD 10 and a recording operation on the videotape 11 are stopped.

According to the video copying apparatus 1 according to the embodiment thus, a user only operates the first copying button 6a and thereby, video and audio recorded on the DVD 10 by a digital signal can be copied to the videotape 11 by an analog signal. Also, it is constructed so as to determine a recording mode of video and audio with respect to the videotape 11 based on the remaining amount of the videotape 11 and the reproduction time of the video and audio copied the time before copying, so that the videotape 11 can be used effectively.

Figure 4:
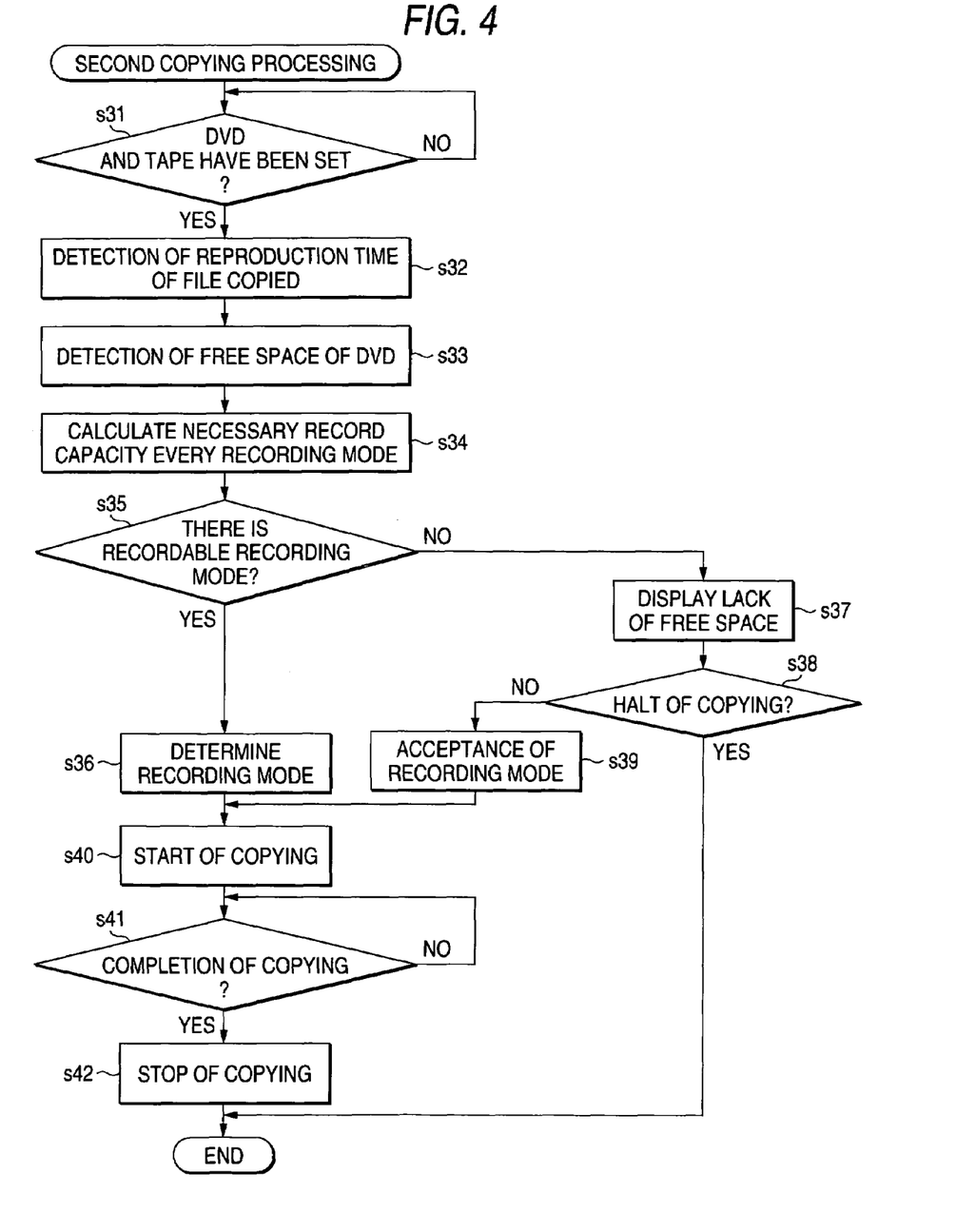
FIG. 4 is a flowchart showing second copying processing in the video copying apparatus.

Next, second copying processing according to s5 will be described. FIG. 4 is a flowchart showing second copying processing in the video copying apparatus which is the embodiment of the invention. The video copying apparatus 1 starts the processing when the second copying button 6b is operated or a control command for instructing execution of copying of video and audio from the videotape 11 to the DVD 10 is sent from a remote controller (not shown).

First, the video copying apparatus 1 decides whether or not the DVD 10 and the videotape 11 have been set in the apparatus, and when either of them has not been set, it waits for being set (s31). When both the DVD 10 and the videotape 11 have been set in the apparatus, the video copying apparatus 1 detects reproduction time of video and audio copied to the DVD 10 (s32). In s32, the reproduction time of video and audio copied is detected by fast-forwarding the videotape 11 to the end and counting a control signal. As is well known, the control signal used for matching a relation at the time of recording with a relation between a tape travel speed and a rotational position of a video head at the time of reproducing is recorded on the videotape 11 in the case of recording video and audio on the videotape 11. In other words, the control signal is not recorded in an area in which video and audio are not recorded, so that by counting the control signal in s32, it is not decided that an unrecorded area of the videotape 11 in which video and audio are not recorded is an area in which video and audio copied are recorded. Also, when the videotape 11 is fast-forwarded to the end and the reproduction time of video and audio copied to the DVD 10 is detected, the videotape 11 is rewound by the amount fast-forwarded the time.

Next, the video copying apparatus 1 detects free space of the DVD 10 set in the apparatus (s33). In s33, by reading information recorded in a read-in area of the DVD 10, the total capacity of files recorded on the DVD 10 and the total storage capacity of the DVD 10 are obtained and a difference between both the capacities is detected as the free space. Also, the video copying apparatus 1 calculates record capacity necessary for recording of video and audio of the reproduction time detected in s32 every recording mode of the DVD 10 (s34). The recording mode of the DVD 10 means a compression ratio of video and audio recorded, and compression ratios of six stages of, for example, A, B, C, D, E and F are preset. Here, it is assumed that the compression ratios increase in order of A, B, C, D, E and F. Also, as the compression ratios increase, image quality etc. of video recorded on the DVD 10 decrease but the record capacity necessary becomes smaller.

When the record capacity necessary for recording of the video and audio every recording mode in s34 is calculated, the video copying apparatus 1 decides whether or not there is a recordable recording mode (s35). In s35, it is decided that there is the recordable recording mode when the record capacity of the DVD 10 required in the case of making recording in the recording mode with the highest compression ratio is less than or equal to the free space of the DVD 10 detected in s33. When the video copying apparatus 1 decides that there is the recordable recording mode in s35, a recording mode of the DVD 10 in the copying is determined (s36). In s36, the recording mode (compression ratio) in which the necessary record capacity calculated every recording mode in s34 is less than or equal to the free space of the DVD 10 detected in s33 and is maximum is determined in the recording mode of video and audio with respect to the DVD 10 of the time.

On the other hand, when the video copying apparatus 1 decides that there is not the recordable recording mode in s35, its message is displayed on the display unit 7 (s37), and an input as to whether or not the copying of video and audio from the videotape 11 to the DVD 10 is halted is demanded from a user. By such display in s37, the user recognizes that video and audio cannot be copied to the end when the video and audio are copied from the videotape 11 to the DVD 10 set in the apparatus. Then, after the user recognizes that the video and audio are not copied to the end, the user decides whether or not the copying is performed, and its result is inputted to the apparatus. Also, reproduction time of the discontinuous video and audio which cannot be copied may be displayed on the display unit 7 every recording mode in s37. As a result of the, information for making a proper decision may be given to the user.

When the video copying apparatus 1 decides that a halt of the copying of video and audio from the videotape 11 to the DVD 10 is inputted by the user in s38, the present processing is ended. On the other hand, when it is decided that execution of the copying is inputted by the user in s38, specification of a recording mode is accepted (s39) Thus, the video copying apparatus 1 makes the user specify the recording mode in the case that the free space of the DVD 10 is lacking even when recording is made in any recording modes in copying of video and audio from the videotape 11 to the DVD 10.

In the case of determining a recording mode of the DVD 10 in s36 and the case of accepting specification of a recording mode by the user in s39, the video copying apparatus 1 starts copying of video and audio from the videotape 11 to the DVD 10 (s40). In s40, the second recording and reproducing unit 4 starts reproduction of the videotape 11, and the copying controller 5 passes a recorded signal in which A/D conversion of a reproduced signal passed from the second recording and reproducing unit 4 is made by the A/D conversion part to the first recording and reproducing unit 3. The first recording and reproducing unit 3 compresses the recorded signal passed from the copying controller 5 in the encoder in the recording mode determined in s36 or in the recording mode accepted in s39, and records the compressed data on the DVD 10.

When the copying of the video and audio from the videotape 11 to the DVD 10 is completed (s41), the video copying apparatus 1 stops a copying operation (s42) and ends the present processing. In s41, it is decided that the copying is completed in the case that the copying of video and audio recorded on the videotape 11 is completed and the case that the free space runs out in the DVD 10 set in the apparatus. Also, in s42, a reproducing operation of the videotape 11 and a recording operation on the DVD 10 are stopped.

According to the video copying apparatus 1 according to the embodiment thus, a user only operates the second copying button 6b and thereby, video and audio recorded on the videotape 11 by an analog signal can be copied to the DVD 10 by a digital signal. Also, it is constructed so as to determine a recording mode of video and audio with respect to the DVD 10 based on the free space of the DVD 10 and the reproduction time of video and audio recorded on the videotape 11 and copied to the DVD 10 before copying, so that a record area of the DVD 10 can be used effectively.

As described above, according to the embodiment, the first copying unit (copying controller 5) copies video and audio recorded on the optical disk by a digital signal to the videotape by an analog signal, and the second copying unit (copying controller 5) records video and audio recorded on the videotape by the analog signal on the optical disk by the digital signal. Also, when execution of the first copying unit is instructed, the first recording mode determination unit (controller 2) detects the remaining amount of the videotape set in the apparatus and reproduction time of video and audio copied to the videotape and based on these, it is determined whether the video and audio are recorded on the videotape in the standard mode or the longer-recording mode. For example, when the videotape is not lacking (video and audio can be copied without discontinuity in the standard mode) in the case of copying video and audio in the standard mode, it is determined in the standard mode, and vice versa, when the videotape is lacking, it is determined in the longer-recording mode. Further, when execution of the second copying unit is instructed, the second recording mode determination unit (controller 2) detects free space of the optical disk set in the apparatus and reproduction time of video and audio copied to the optical disk and based on these, a compression ratio of the video and audio recorded on the optical disk is determined from among plural compression ratios preset. For example, storage capacities of the optical disk necessary for copying of video and audio are calculated every plural compression ratios preset, and the compression ratio of the storage capacity which is less than the free space of the optical disk set in the apparatus and is maximum among the storage capacities calculated herein is selected.

Accordingly, video and audio can be copied mutually between the optical disk on which the video and audio are recorded by a digital signal and the videotape on which the video and audio are recorded by an analog signal and record areas of record media (videotape and optical disk) to which the video and audio are copied can be used effectively.

Also, the remaining amount of the videotape set in the apparatus can be detected automatically and accurately by fast-forwarding the videotape to the end. In the case, copying of video and audio is started after the videotape is rewound by the amount fast-forwarded.

Also, reproduction time of video and audio copied to the optical disk can be detected automatically and accurately by fast-forwarding the videotape set in the apparatus and counting a control signal. In the case, copying of video and audio is started after the videotape is rewound by the amount fast-forwarded.

Incidentally, the control signal used for matching a relation at the time of recording with a relation between a tape travel speed and a rotational position of a video head at the time of reproducing is recorded on the videotape in the case of recording video and audio on the videotape. In other words, the control signal is not recorded in an area in which video and audio are not recorded, so that by counting the control signal as described above, it is not decided that an unrecorded area of the videotape in which video and audio are not recorded is an area in which video and audio copied are recorded, and the reproduction time of video and audio copied to the optical disk can be detected automatically and accurately.

Further, operability of a user can be improved by providing input unit (operation unit 6) having a first button for instructing execution of the first copying unit and a second button for instructing execution of the second copying unit.

According to the embodiment, video and audio can simply be copied mutually between an optical disk on which the video and audio are recorded by a digital signal and a videotape on which the video and audio are recorded by an analog signal and ease of use or operability of a user can be improved remarkably and also a record area of a record medium to which the video and audio are copied can be used effectively.

Although the present invention has been shown and described with reference to a specific preferred embodiment, various changes and modifications will be apparent to those skilled in the art from the teachings herein. Such changes and modifications as are obvious are is deemed to come within the spirit, scope and contemplation of the invention as defined in the appended claims.

FIG. 1
1 VIDEO COPYING APPARATUS
2 CONTROLLER
3 FIRST RECORDING AND REPRODUCING UNIT
4 SECOND RECORDING AND REPRODUCING UNIT
5 COPYING CONTROLLER
6 OPERATION UNIT
7 DISPLAY UNIT
A1 REPRODUCED SIGNAL
A2 RECORDED SIGNAL
FIG. 2
A1 VIDEO COPYING APPARATUS
s1 PRESENCE OF INPUT TO APPARATUS
s2 COPYING FROM DVD TO TAPE
s3 FIRST COPYING PROCESSING
s4 COPYING FROM TAPE TO DVD
s5 SECOND COPYING PROCESSING
s6 OTHER PROCESSING
FIG. 3
A1 FIRST COPYING PROCESSING
s11 HAVE DVD AND TAPE BEEN SET?
s12 ACCEPTANCE OF SPECIFICATION OF FILE COPIED
s13 DETECTION OF REPRODUCTICN TIME OF FILE COPIED
s14 DETECTION OF REMAINING AMOUNT OF TAPE
s15 CAN RECORDING BE MADE IN STANDARD MODE?
S16 DETERMINE RECORDING MODE IN STANDARD MODE
S17 DETERMINE RECORDING MODE IN LONGER-RECORDING MODE
s18 CAN RECORDING BE MADE?
s19 DISPLAY LACK OF REMAINING AMOUNT OF TAPE
s20 HALT OF COPYING
S21 START OF COPYING
s22 COMPLETION OF COPYING
s23 STOP OF COPYING
FIG. 4
A1 SECOND COPYING PROCESSING
s31 HAVE DVD AND TAPE BEEN SET?
S32 DETECTION OF REPRODUCTION TIME OF FILE COPIED

S33 DETECTION OF FREE SPACE OF DVD
S34 CALCULATE NECESSARY RECORD CAPACITY EVERY RECORDING MODE
S35 IS THERE RECORDABLE RECORDING NODE?
S36 DETERMINE RECORDING MODE
S37 DISPLAY LACK OF FREE SPACE
S38 HALT OF COPYING
S39 ACCEPTANCE OF RECORDING MODE
S40 START OF COPYTNG
S41 COMPLETION OF COPYING
S42 STOP OF COPYING

What is claimed is:

1. A video copying apparatus comprising:
a first recording and reproducing unit that records video and audio on an optical disk and reproduces video and audio recorded on the optical disk;
a second recording and reproducing unit that records video and audio on a videotape and reproduces video and audio recorded on the videotape;
a first copying unit that controls the first recording and reproducing unit to reproduce the video and audio recorded on the optical disk and controls the second recording and reproducing unit to record the video and audio reproduced by the first recording and reproducing unit on the videotape;
a second copying unit that controls the second recording and reproducing unit to reproduce the video and audio recorded on the videotape and controls the first recording and reproducing unit to record the video and audio reproduced by the second recording and reproducing unit on the optical disk;
a first recording mode determination unit that, when execution of the first copying unit is instructed, detects remaining amount of the videotape and reproduction time of the video and audio to be copied onto the videotape by fast-forwarding the videotape to the end, and determines whether to record the video and audio onto the videotape in a standard mode or in a longer-recording mode based on the remaining amount of the videotape and the reproduction time of the video and audio to be copied onto the videotape;
a second recording mode determination unit that, when execution of the second copying unit is instructed, detects free space of the optical disk and reproduction time of video and audio to be copied onto the optical disk by fast-forwarding the videotape to the end, and determines a compression ratio of the video and audio to be used in recording the video and audio on the optical disk from among a plurality of preset compression ratios; and
an input unit having a first button for instructing execution of the first copying unit and a second button for instructing execution of the second copying unit.

2. A video copying apparatus comprising:
a first recording and reproducing unit that records video and audio on an optical disk and reproduces video and audio recorded on the optical disk;
a second recording and reproducing unit that records video and audio on a videotape and reproduces video and audio recorded on the videotape;
a first copying unit that controls the first recording and reproducing unit to reproduce the video and audio recorded on the optical disk and controls the second recording and reproducing unit to record the video and audio reproduced by the first recording and reproducing unit on the videotape;
a second copying unit that controls the second recording and reproducing unit to reproduce the video and audio recorded on the videotape and controls the first recording and reproducing unit to record the video and audio reproduced by the second recording and reproducing unit on the optical disk;
a first recording mode determination unit that, when execution of the first copying unit is instructed, detects remaining amount of the videotape and reproduction time of the video and audio to be copied onto the videotape, and determines whether to record the video and audio onto the videotape in a standard mode or in a longer-recording mode based on the remaining amount of the videotape and the reproduction time of the video and audio to be copied onto the videotape; and
a second recording mode determination unit that, when execution of the second copying unit is instructed, detects free space of the optical disk and reproduction time of video and audio to be copied onto the optical disk, and determines a compression ratio of the video and audio to be used in recording the video and audio on the optical disk from among a plurality of preset compression ratios.

3. The video copying apparatus according to claim 2, wherein the first recording mode determination unit detects the remaining amount of the videotape by fast-forwarding the videotape to the end.

4. The video copying apparatus according to claim 2, wherein the second recording mode determination unit detects the reproduction time of the video an audio to be copied by fast-forwarding the videotape to the end.

5. The video copying apparatus according to claim 2, further comprising an input unit having a first button for instructing execution of the first copying unit and a second button for instructing execution of the second copying unit.

6. A video copying apparatus comprising:
a first recording and reproducing unit that records video and audio on an optical disk and reproduces video and audio recorded on the optical disk;
a second recording and reproducing unit that records video and audio on a videotape and reproduces video and audio recorded on the videotape;
a copying unit that controls the first recording and reproducing unit to reproduce the video and audio recorded on the optical disk and controls the second recording and reproducing unit to record the video and audio reproduced by the first recording and reproducing unit on the videotape; and
a recording mode determination unit that, when execution of the copying unit is instructed, detects remaining amount of the videotape and reproduction time of the video and audio to be copied onto the videotape, and determines whether to record the video and audio onto the videotape in a standard mode or in a longer-recording mode based on the remaining amount of the videotape and the reproduction time of the video and audio to be copied onto the videotape.

7. The video copying apparatus according to claim 6, wherein the recording mode determination unit detects the remaining amount of the videotape by fast-forwarding the videotape to the end.

8. The video copying apparatus according to claim 6, further comprising an input unit having a button for instructing execution of the copying unit.

9. A video copying apparatus comprising:

a first recording and reproducing unit that records video and audio on an optical disk and reproduces video and audio recorded on the optical disk;

a second recording and reproducing unit that records video and audio on a videotape and reproduces video and audio recorded on the videotape;

a copying unit that controls the second recording and reproducing unit to reproduce the video and audio recorded on the videotape and controls the first recording and reproducing unit to record the video and audio reproduced by the second recording and reproducing unit on the optical disk; and a recording mode determination unit that, when execution of the copying unit is instructed, detects free space of the optical disk and reproduction time of video and audio to be copied onto the optical disk, and determines a compression ratio of the video and audio to be used in recording the video and audio on the optical disk from among a plurality of preset compression ratios.

10. The video copying apparatus according to claim 9, wherein the recording mode determination unit detects the reproduction time of the video an audio to be copied by fast-forwarding the videotape to the end.

11. The video copying apparatus according to claim 9, further comprising an input unit having a button for instructing execution of the second copying unit.

* * * * *